J. CESERANI.
SAFETY BRAKE MECHANISM FOR ELEVATORS AND HOISTING CAGES.
APPLICATION FILED JULY 2, 1913.
1,091,292.
Patented Mar. 24, 1914.
2 SHEETS—SHEET 1.
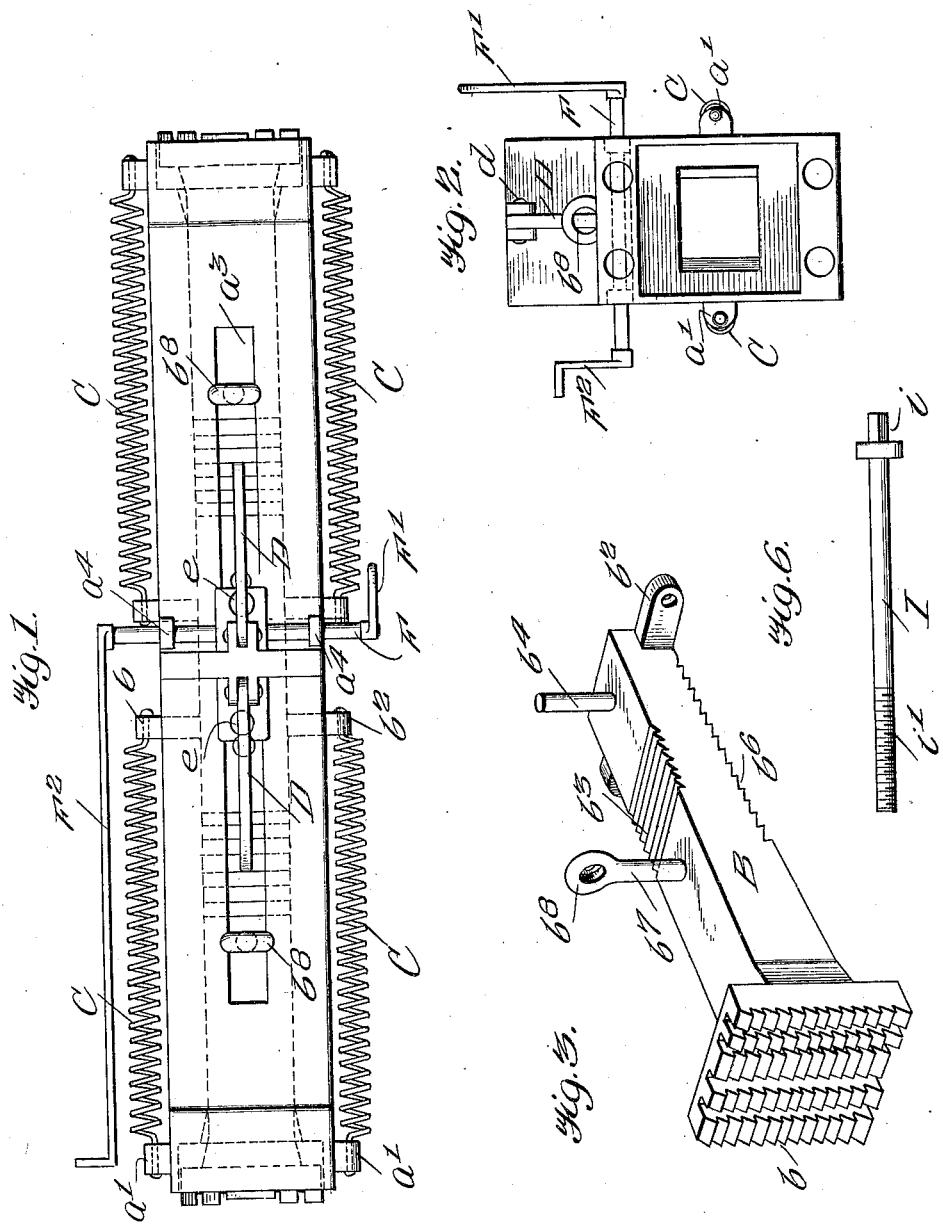
WITNESSES
E. M. Callaghan
Myron H. Clear
INVENTOR
JOHN CESERANI,
BY Munn & Co.
ATTORNEYS

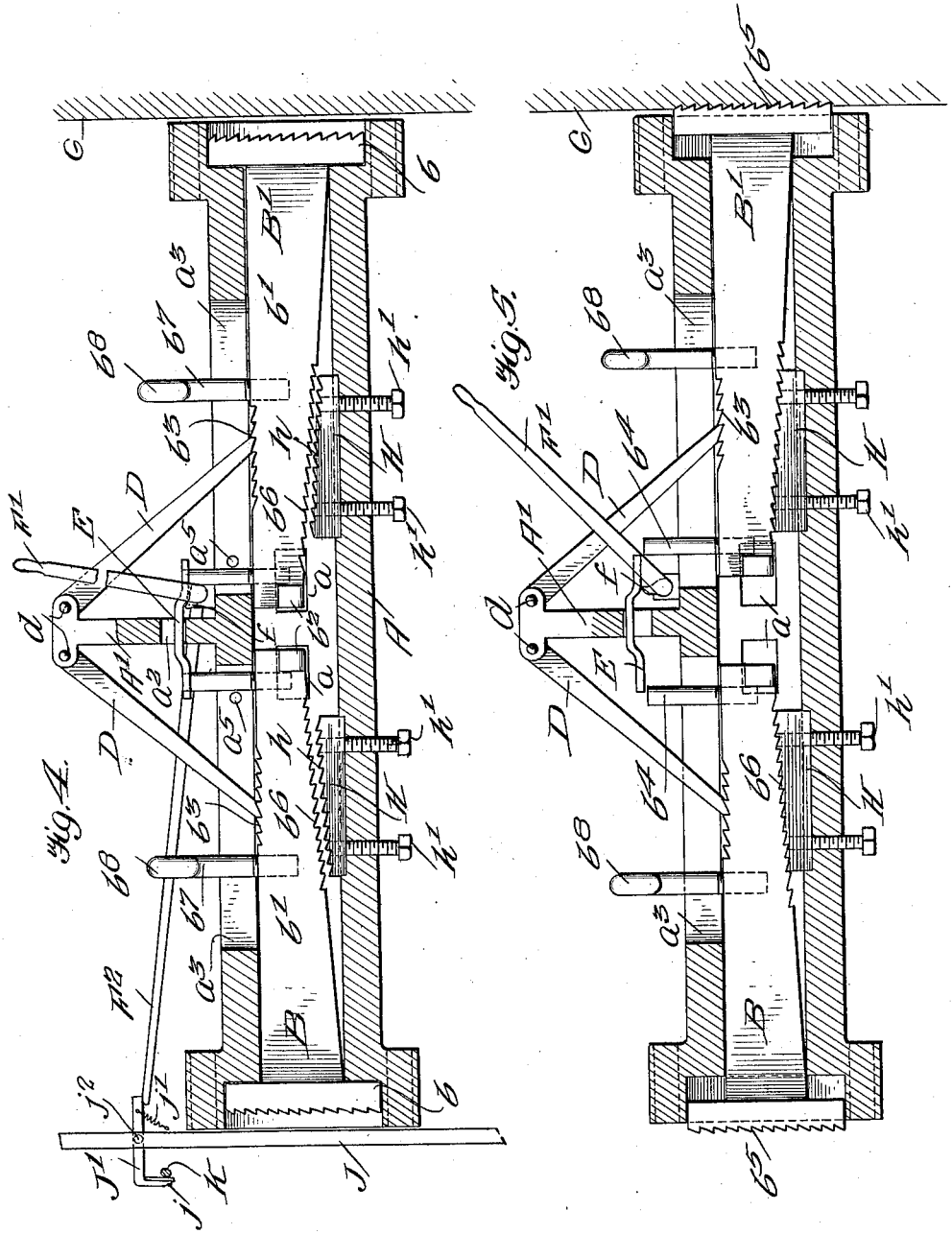

UNITED STATES PATENT OFFICE.

JOHN CESERANI, OF BUTTE, MONTANA.

SAFETY BRAKE MECHANISM FOR ELEVATORS AND HOISTING-CAGES.

1,091,292.  Specification of Letters Patent. Patented Mar. 24, 1914.

Application filed July 2, 1913.  Serial No. 776,994.

*To all whom it may concern:*

Be it known that I, JOHN CESERANI, a citizen of the United States, and a resident of Butte, in the county of Silverbow and State of Montana, have made a new and useful Improvement in Safety Brake Mechanism for Elevators and Hoisting-Cages, of which the following is a specification.

My present invention relates to safety brakes designed for mining cages and elevators, and my object is to provide a simple and inexpensive apparatus which may be actuated by a passenger or other person on the cage, in case of an accident such as the breaking of a rope, engine running away, a wrecked shaft, and other causes, permitting the passenger or other occupant of the cage to quickly and effectively check and lock the cage against movement.

The means by which I accomplish the above objects and certain others which will be hereinafter made apparent, are shown in the accompanying drawings, in which—

Figure 1 is a plan view of my improved apparatus. Fig. 2 is an end elevation of the same with the brake blocks removed. Fig. 3 is a perspective view of one of the brake blocks removed. Fig. 4 is a central vertical section through the apparatus shown in Fig. 1 and illustrating the brake blocks locked in inoperative position. Fig. 5 is a similar view illustrating the brake blocks released and extended in operation, and, Fig. 6 is a side elevation of the retracting screw for resetting the brake blocks after an actuation thereof.

Referring now to these figures, the casing or box A which incloses the brake members B and B' is tubular in form and rectangular in cross-section, its outer ends being provided with enlarged cavities, communicating with its bore and within which the heads $b$ of the brake members are disposed. These brake members each include tapering shanks $b'$ extending inwardly from their heads $b$, their inner ends being adjacent one another and provided with laterally projecting lugs $b^2$ extending outwardly through side slots $a$ of the casing or box, the latter having similarly outstanding though rigid lugs $a'$ adjacent its outer ends and between which and the before mentioned movable lugs $b^2$ are extended retractile coil springs C, these springs extending upon opposite sides of each of the brake members and along the exterior of the casing or box.

Centrally between its ends, the casing or box A is provided with a rigid upstanding bracket A' having a transverse slotted opening $a^2$ adjacent its lower end and having laterally extended portions at its upper end to which are pivotally mounted, at $d$, the upper ends of depending outwardly inclined locking arms D, the lower ends of these arms extending inwardly of the casing or box through longitudinal slots $a^3$ in its upper wall and into engagement with ratcheted portions $b^3$ of the upper faces of the brake members B and B', all as particularly shown in Figs. 4 and 5.

Adjacent their inner ends the brake members B and B' are provided with rigid locking pins $b^4$ upstanding through the casing slots $a^3$ upon opposite sides of the bracket A' and the upper ends of which are adapted for engagement in apertures $e$ adjacent opposite ends of a latch plate E, this plate being extended through the bracket opening $a^2$ and being movable up and down therein, engagement between this plate and the pins $b^4$ as stated serving to hold the brake members in their inner retracted and inoperative position as shown in Fig. 4.

At one side of the bracket A', the casing or box A is provided with upstanding apertured lugs $a^4$ forming bearings and through which is journaled a transverse shaft F, at one end of which and upon one side of the casing or box is secured a lever or handle F' and at the other end of which, upon the opposite side of the casing or box is secured an arm F², both the lever F' and the arm F² normally extending horizontally and longitudinally along side of the casing or box in relatively opposite directions. Intermediate its ends the shaft F is provided with a cam lug $f$, as particularly shown in Figs. 4 and 5, and which is located beneath the latch plate E. Thus when the lever F' is depressed, shaft F will be rotated and its cam lug $f$ lifted to engage and raise the latch plate E in the slot $a^2$ of bracket A', this action resulting in releasing the brake members B and B' in order that their actuating springs C may draw the same longitudinally in order to project their heads $b$ beyond the ends of the casing or box, these heads, it will be noted, being provided with ratcheted outer faces $b^5$, teeth of which are inclined downwardly in order to engage the opposite side walls or strips secured to the opposite side walls, of the casing, indicated at G in Figs. 4 and 5. When so moved to operative positions in order to check and lock the cage or elevator from further downward movement, the brake members B and B' are secured against accidental inward movement both by the action of the lower ends of the locking arms D in engagement with the ratcheted portions $b^3$ of the upper surfaces of the brake members, and locking blocks H secured in recesses within the lower wall of the casing or box A upon opposite sides of its center, these blocks having upper inclined and ratcheted faces $h$ into engagement with which the lower ratcheted portions $b^6$ of the brake members are thrust when their outer ends grip the side walls of strips G.

In order to retract the brake members after actuating, I provide each of them with a rigid upstanding bolt $b^7$ at points intermediate their ends, these bolts projecting upwardly through the casing slot $a^3$ and having threaded eyes $b^8$ at their upper ends alined horizontally with one another and with the lower opening $a^2$ of the casing bracket A'. I also thread set screws $h'$ through the lower wall of the casing or box A and through the locking blocks H, whereby the shanks $b'$ of the brake members may be forced upwardly and out of engagement with these brake blocks when the screws $h'$ are turned inwardly. I also provide a retracting bolt or screw as shown at I in Fig. 6, this bolt or screw having a head $i$ adjacent one end and having its opposite end $i'$ threaded and being adapted to be projected through the opening $a^2$ of the bracket A' when the latch plate E is removed, its threaded end $i'$ engaging within the threaded eyes $b^8$ whereby upon turning the retracting bolt or screw in one direction after lifting the respective locking arm D out of engagement with the respective brake member, this brake member may be drawn inwardly and temporarily locked in inner retracted position by a transverse pin or other implement extended through apertures $a^5$ of the casing or box.

In practical use the improved safety brake apparatus I have shown may be secured across a mine cage directly below the cross heads of the cage and when used in connection with elevators the apparatus may be placed beneath and transversely of the elevator cage or in any other position, provided access can be had of course, to the actuating lever F'. In any case I prefer that the mine or elevator cage may be provided adjacent one side with a support, indicated at J in Fig. 4 extending along one side of one end of the casing or box A, and to which support is intermediately pivoted at $j^2$ a knife arm J' having its outer end provided with a depending blade $j$ and having its inner end held in engagement with the outer end of the arm $F^2$, before mentioned by a spring $j'$. I also preferably extend one of the lighting wires or a special signal wire, indicated at K in Fig. 4, between the support J and the blade $j$ and adjacent the inner sharpened edge of said blade in order that when the knife arm is actuated the wire K will be severed for the purpose of actuating a signal in the engine room or at some other convenient point, this actuation of the knife arm being effected as will be clearly seen by upward movement of the arm $F^2$ which occurs when the actuating lever F' is depressed and the shaft F rotated thereby in one direction.

I claim:

1. In a safety brake apparatus for hoisting cages, the combination of a tubular casing open at its opposite ends, brake members disposed in the casing and movable from the opposite open ends thereof, springs for actuating the brake members, a bracket secured to the casing and provided with an intermediate opening, a latch member movable in the bracket opening to engage portions of the brake members and hold the latter in inner retracted position, an actuating lever for releasing the latch member, and members carried by the said bracket and by the casing and engaging relatively opposite sides of the brake members whereby to lock the latter in extended operative position, all for the purpose described.

2. In a safety brake apparatus for hoisting cages, the combination of a tubular slotted casing open at its ends, brake members disposed in the casing for movement from opposite ends thereof and having pins upstanding through the casing slots, an intermediate upstanding bracket carried by the casing and having an intermediate aperture, an apertured latch plate movable in the bracket aperture to engage the said pins of the brake members and lock the members in inner retracted position, a cam member mounted beneath the latch member, a lever for raising the cam to release the latch member, and springs for actuating the brake members when released.

3. In a safety brake apparatus for hoisting cages, the combination of a tubular casing open at its ends, brake members disposed in the casing and movable from opposite ends thereof, means for locking the brake members in inner retracted positions, a lever for releasing the said locking means, springs for actuating the brake members when released, the said brake members including outer heads provided with engaging teeth and inwardly projecting shanks having ratcheted lower surfaces, and locking blocks secured in the lower portion of the casing and provided with ratcheted faces with which the said ratcheted faces of the brake members engage when the latter are moved outwardly to operative positions.

4. In a safety brake apparatus for hoisting cages, the combination of a tubular casing open at its ends, brake members disposed in the casing and movable from opposite ends thereof, means for locking the brake members in inner retracted positions, a lever for releasing the said locking means, springs for actuating the brake members when released, the said brake members including outer heads provided with engaging teeth and inwardly projecting shanks having ratcheted lower surfaces, locking blocks secured in the lower portion of the casing and provided with ratcheted faces with which the said ratcheted faces of the brake members engage when the latter are moved outwardly to operative positions, a set screw threaded through the lower portions of the casing whereby to disengage the brake members from the said locking blocks, and means for drawing the brake members inwardly to retracted positions when disengaged substantially as described.

5. In a safety brake apparatus for hoisting cages, the combination of a tubular casing open at its ends, brake members disposed in the casing and movable from opposite ends thereof, means for locking the said brake members in inner retracted positions, a lever for releasing the brake members, springs for actuating the brake members when so released, the said brake members having outer headed ends provided with teeth and inwardly projecting shanks having ratcheted upper portions, a bracket upstanding from the casing, and locking arms pivoted to the upper portions of the bracket and inclined outwardly in opposite directions whereby to engage the ratcheted upper portions of the brake members with their lower ends.

6. In a safety brake apparatus for hoisting cages, the combination of a slotted casing open at its ends, spring actuated brake members disposed in the casing and movable from opposite ends thereof, and having bolts upstanding therefrom through the casing slots and provided with threaded eyes at their upper ends, a bracket upstanding from the casing and provided with an aperture alined with the said threaded eyes, and a retracting bolt for engagement through the said bracket aperture and threaded at one end for engagement within the threaded eyes whereby to draw the brake members inwardly to retracted positions after actuation.

7. In a safety brake apparatus for hoisting cages, the combination of a tubular casing open at its ends, brake members disposed in the casing and movable from opposite ends thereof, a latch plate for locking the said brake members in inner retracted position, a shaft journaled transversely upon the casing and having a cam member beneath the latch plate, a lever connected to one end of the said shaft whereby to rock the same and lift the latch plate, springs for actuating the brake members when released, and a signal actuating arm extending from the opposite end of the said shaft, all for the purpose described.

JOHN CESERANI.

Witnesses:
JAMES W. TIPPETT,
THOS. HARRIS.

Copies of this patent may be obtained for five cents each, by addressing the "Commissioner of Patents, Washington, D. C."